United States Patent [19]

Farrow et al.

[11] Patent Number: 5,777,893
[45] Date of Patent: Jul. 7, 1998

[54] INDUCTIVE LOOP DIAGNOSTIC INTERFACE

[75] Inventors: Cyril Arthur Farrow, Pietermaritzburg; John Brass, Kwazulu Natal, both of South Africa

[73] Assignee: Electromatic (Proprietary) Limited, Pietermaritzburg, South Africa

[21] Appl. No.: 665,285

[22] Filed: Jun. 17, 1996

Related U.S. Application Data

[63] Continuation-in-part of Ser. No. 285,119, Aug. 3, 1994, Pat. No. 5,621,661.

[30] Foreign Application Priority Data

Aug. 4, 1993 [ZA] South Africa .............. 93/5634

[51] Int. Cl.$^6$ ............................................. G08G 1/048
[52] U.S. Cl. .................... 364/551.01; 340/825.15; 340/870.28; 340/931; 340/941
[58] Field of Search ...................... 364/436, 550, 364/551.01; 340/825.16, 825.15, 825.17, 825.54, 870.28, 870.29, 907, 908, 931, 941, 942; 341/13, 14; 250/338.1

[56] References Cited

U.S. PATENT DOCUMENTS

| | | | |
|---|---|---|---|
| 4,398,172 | 8/1983 | Carroll et al. | 340/942 |
| 4,430,636 | 2/1984 | Bruce | 340/941 |
| 4,472,706 | 9/1984 | Hodge et al. | 340/941 |
| 4,566,008 | 1/1986 | Powers et al. | 340/941 |
| 4,680,717 | 7/1987 | Martin | 364/436 |
| 5,512,891 | 4/1996 | Kang | 340/941 |

FOREIGN PATENT DOCUMENTS

1462054  1/1977  United Kingdom .

*Primary Examiner*—James P. Trammell
*Assistant Examiner*—Edward J. Pipala
*Attorney, Agent, or Firm*—Spencer & Frank

[57] ABSTRACT

A system and method for transferring historic and instantaneous diagnostic data relating to performance of an inductive loop vehicle detector 10 is disclosed and claimed. The aforementioned date is gathered over a period of time, updated and stored in a detector unit 14 forming part of the system. The stored data is then used repeatedly to modulate visible light emitted by a light emitting device 22 on the unit 14 at such a rate that the data would not be discernible to a human. The data is received by a portable data reading device 24 which is brought into optical communication with the device 22.

12 Claims, 6 Drawing Sheets

INDUCTIVE LOOP DIAGNOSTIC INTERFACE

INTRODUCTION AND BACKGROUND

This application is a continuation-in-part application based on U.S. patent application Ser. No. 08/285,119 filed 3rd Aug. 1994, now U.S. Pat. No. 5,621,661.

The invention relates to a system and method for transferring data relating to the performance of an inductive loop detector of the kind used for detecting the passage or presence of vehicles. The data which is transferred relates to the operation, and to the fault diagnosis, of the detector which consists of an inductive loop mounted in a road or pavement structure and a detector unit permanently connected to the loop, to energize the loop and to control and monitor its operation.

The inductive loops, in use, are subjected to severe loading by the wheels of traffic passing over the loop, severe temperature changes and cross-talk from neighbouring loops. As a result of the action of passing traffic and temperature fluctuations, the loops may become damaged. For example, due to expansion of the pavement layer wherein the loop is mounted, the loop may be severed, resulting in an open circuit in the loop. As a result of subsequent contraction of the layer, the loop may become and remain continuous again for a period of time, but the fault may intermittently re-occur.

It is known to provide a vehicle detector of the kind described with a special visual output indicator and to pulse or flesh the indicator slowly to transmit information on the present status only of the inductive loop detector, thereby to transfer information to an operator. The pulse rate is sufficiently low to ensure that a human operator may observe and count or evaluate the pulses.

An example of such a system is that disclosed In U.S. Pat. No. 4,566,008 to Powers. The detector unit of this system comprises a plurality of LED's to indicate in real time, existing or instantaneous faults in a form discernable to a human. Powers does not teach that diagnostic data may be gathered over a period of time and is continuously updated to provide historic diagnostic data as well as instantaneous diagnostic data. The apparatus and method of Powers would not be able to find and identify the intermittent problem referred to hereinbefore.

Most other systems known to the applicant perform the diagnostic tests and provide indications of only existing faults. Since no historical data is available, these system are also not capable of finding and identifying intermittent faults as referred to hereinbefore. In most cases diagnostic data is transmitted or displayed only once and that is during power-up or manual reset of the detector.

OBJECT OF THE INVENTION

Accordingly it is an object of the present invention to provide a system and method for transferring diagnostic data relating to performance of an inductive loop vehicle detector with which the applicants believe the aforementioned disadvantages could at least be alleviated.

SUMMARY OF THE INVENTION

According to the invention there is provided a method of transferring diagnostic data from an inductive loop vehicle detector comprising an inductive loop and a detector unit connected to the loop, the method comprising the steps of:
continuously generating within the detector unit diagnostic test data relating to performance of the loop;
storing the generated data in a memory arrangement of the detector to produce stored data comprising at least historic diagnostic data generated over a period of time;
repetitively modulating at least one optical signal output means with the stored data at such a rate that the data is not discernible to a human;
detecting by means of a portable data reading device the signal emitted;
storing data extracted from the signal; and
retrieving the extracted data.

The stored data may further comprise instantaneous diagnostic data.

The historic data may comprise at least one of maximum frequency drift of a signal energizing the loop; minimum and maximum change in inductance of the loop during detection of a vehicle; and time elapsed, all since an immediately preceding reset of the detector.

The instantaneous diagnostic data may comprise at least one of: frequency of a signal energizing the loop; change in inductance of the loop; and loop status data. Loop status data may include open circuit, short circuit, detection of a vehicle and no vehicle detected.

The historic diagnostic data may be produced by, as from the immediately preceding reset of the detector, continually updating the maximum drift of the signal energizing the loop; the maximum and minimum change in inductance of the loop during detection of a vehicle and the time elapsed. A reset may be caused by manually resetting the unit, a power failure and restart, a short circuit condition on the loop end an open circuit condition on the loop.

An alarm signal discernible by a human is preferably provided once the stored data has been received at least once by the data reading device.

Also included within the scope of the present invention is a system for transferring diagnostic data relating to performance of an inductive loop vehicle detector, the system comprising:
an inductive loop vehicle detector and a separate data receiving device;
the inductive loop vehicle detector comprising an inductive loop mountable in a pavement structure and a detector unit connected to the loop;
the detector unit comprising:
a signal source for energizing the loop;
control means for monitoring the loop and generating diagnostic data relating to operation of the loop and the signal source;
memory means for storing and compiling stored data comprising diagnostic data generated over a period of time; and
optical output means, which under the control of the control means is repetitively modulated by a modulation signal which is dependent on the stored data at a rate such that the data would not be discernible by a human;
the separate data reading device comprising:
optical energy sensitive means;
means responsive to the optical energy sensitive means, to produce an output signal which is representative of the modulating signal;
data storage means for storing data extracted from the output signal; and
means for retrieving data from the data storage means.

The optical output means preferably comprises a visible light emitting diode provided on a front face of the detector unit. The visible light emitting diode is preferably a power-up indicator of the detector unit.

The data reading device may comprise an audible alarm which is activated once the stored data has been received by the data reading device, at least once.

Further included within the scope of the invention is an inductive loop vehicle detector comprising:

an inductive loop mountable in a pavement structure; and a detector unit connected to the loop, the detector unit comprising:

a signal source for energizing the loop;

control means for monitoring the loop and generating diagnostic data relating to operation of the loop and the signal source;

memory means for storing and compiling stored data comprising diagnostic data generated over a period of time; and optical output means, which under the control of the control means is repetitively modulated by a modulation signal which is dependent on the stored data at a rate such that the data would not be discernible by a human.

Also included within the scope of the present Invention is a data receiving device for use in receiving diagnostic data relating to performance of an inductive loop vehicle detector, the detector comprising an inductive loop and a detector unit connected to the loop, the data receiving device comprising:

optical energy sensitive means adapted to be brought into communication with an optical output means of the detector unit;

means responsive to the optical energy sensitive means, to produce an output signal which is representative of a modulating signal used to modulate the optical output means;

data storage means for storing data extracted from the output signal; and means for retrieving data from the data storage means.

BRIEF DESCRIPTION OF THE ACCOMPANYING DIAGRAMS

The invention is further described, by way of example only, with reference to the accompanying diagrams wherein.

DESCRIPTION OF A PREFERRED EMBODIMENT OF THE INVENTION

Figure 1:
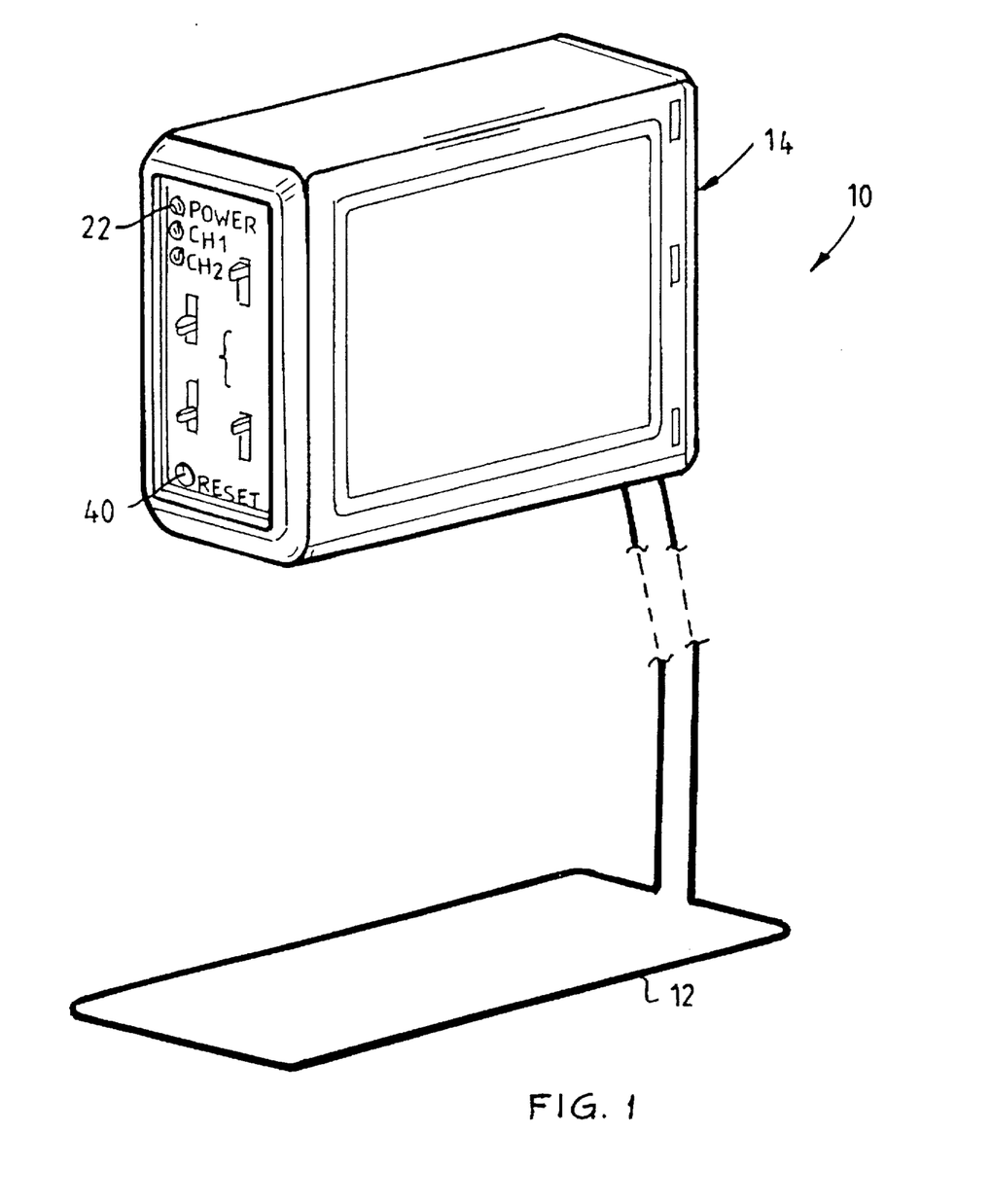
FIG. 1 is a diagrammatic perspective view of an inductive loop vehicle detector comprising an inductive loop and a permanently installed detector unit, both forming part of the system according to the invention.

In FIG. 1, there is shown a vehicle detector 10 forming part of the system according to the invention. The detector 10 comprises an inductive loop 12 of known design which is permanently installed in a pavement structure, towards a top surface thereof. A detector unit 14 is connected to the loop 12, to energize the loop and to perform certain other functions which will be described hereinafter. The detector unit 14 is connectable to a boom (not shown) at an entrance or exit of a parking area or the like or to an automatic traffic controller (also not shown).

It is well known that in use, when a vehicle passes over the loop 12, the inductance of the loop changes and the detector unit 14 detects this change, indicative of a vehicle being detected. The detector unit 14 then transmits a responsive signal to the traffic controller or the controller for the boom The traffic controller utilises these signals in known manner to control switching of traffic lights associated with the traffic controller, in accordance with the requirements of traffic at the time.

Figure 3:
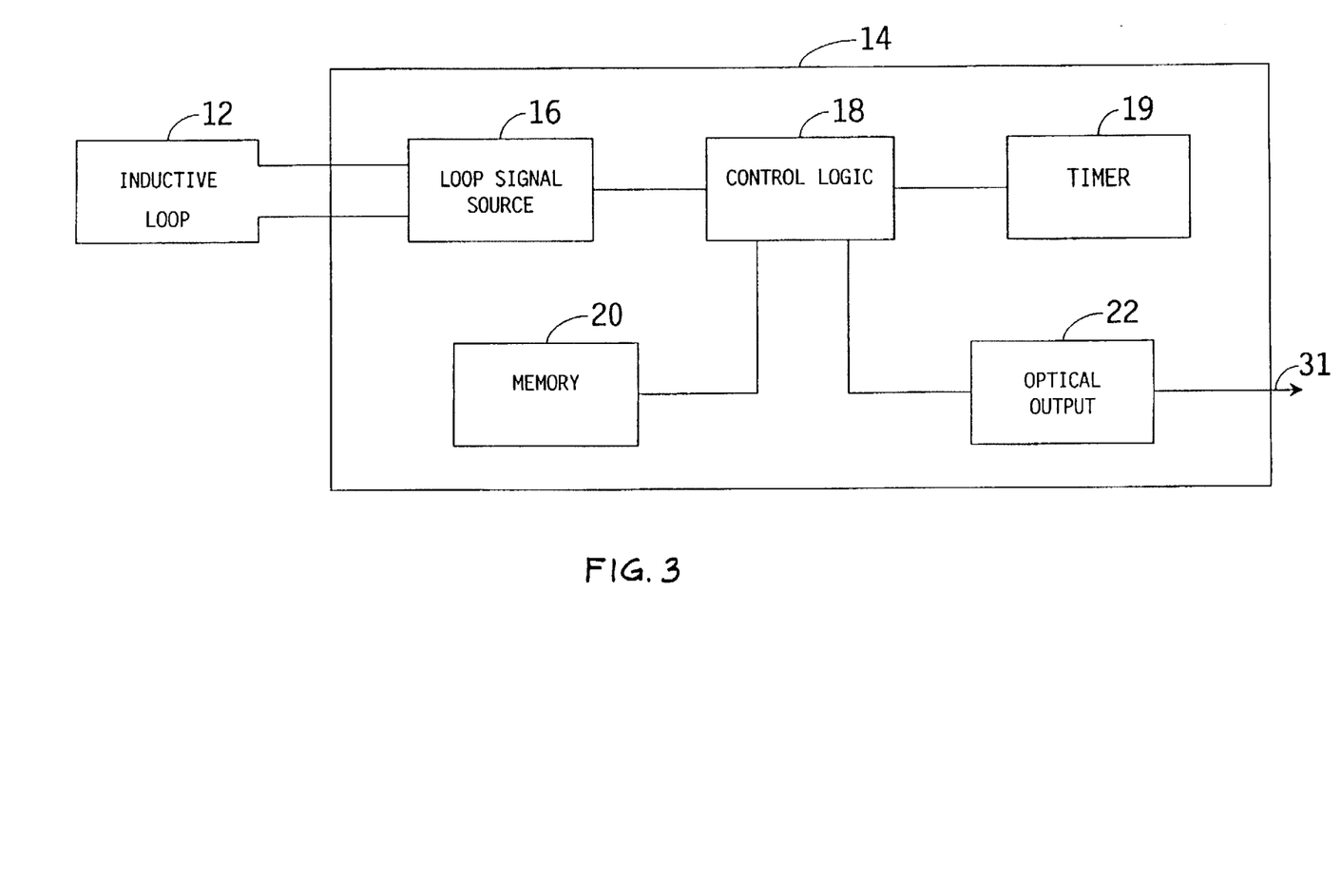
FIG. 3 is a block diagram of relevant electronic circuitry of the detector unit.

As shown in FIG. 3, the detector unit 14 comprises a loop signal source 16 to energize loop 12, control logic or a controller 18 comprising a microprocessor (not shown), a timer 19, a memory arrangement 20 associated with the controller and an optical output 22 connected to the controller 18 To be controlled thereby.

Figure 2:
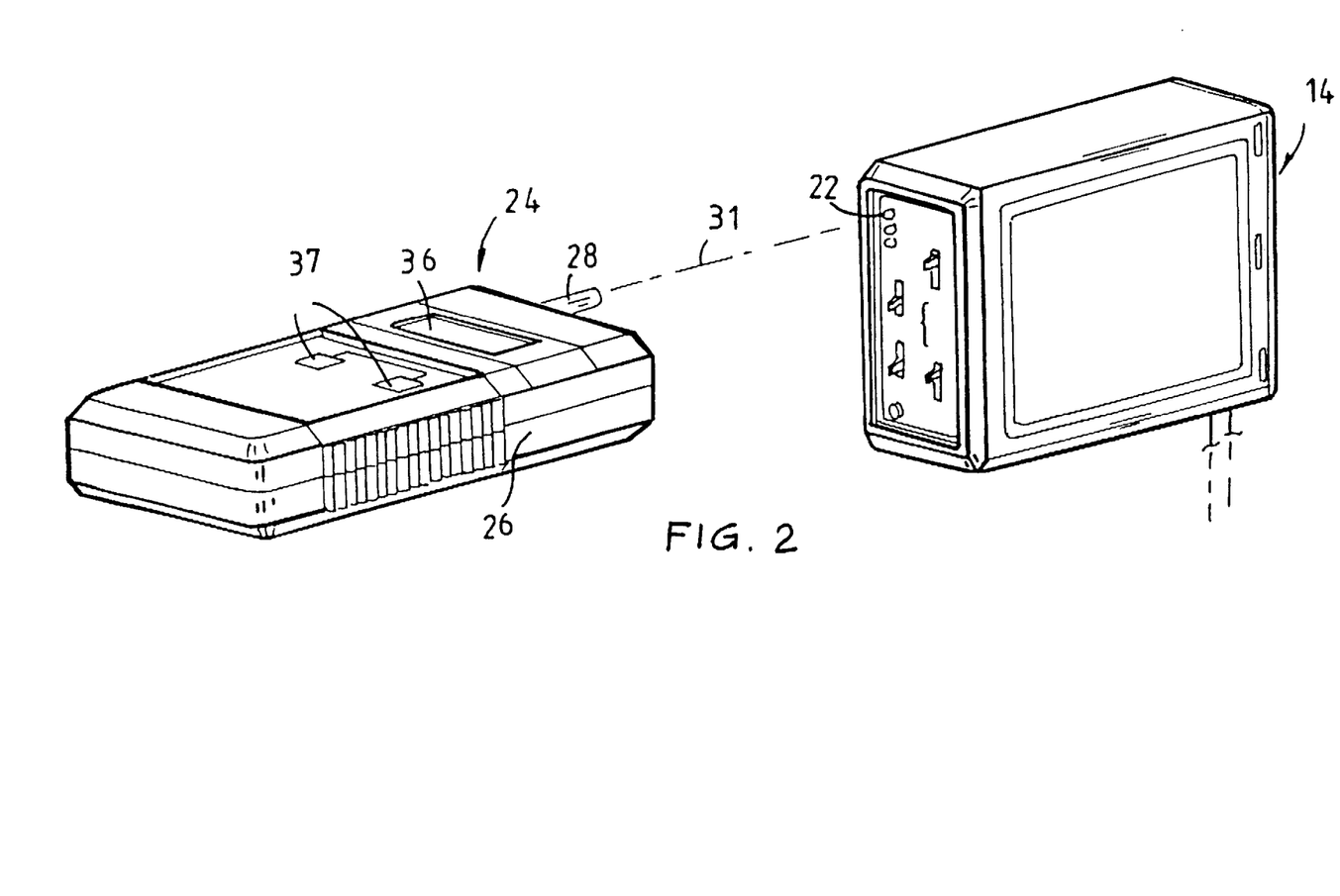
FIG. 2 is a diagrammatic perspective view of a portable data reading unit in position to receive data modulated on an optical output of the detector unit.

In the preferred embodiment, the optical output Is a red light emitting diode (LED) 22 provided on a front face of the unit 14 as shown in FIGS. 1 and 2 and which LED also serves to indicate visibly when the unit 14 is powered up.

In FIG. 2, there is shown a portable and separate, hand-held data reading device 24 for reading diagnostic data transmitted by the unit 14 via LED 22 as will hereinafter be described. The device 24 comprises a housing 26 and a tubular member 28 extending from the housing. In the tubular member 28 and spaced from the distal end thereof, there is provided a suitable optical detector (designated 30 in FIG. 4) to cooperate with LED 22. When the detector 30 is brought in line with the LED 22, an optical data communication path 31 is established between the unit 14 and the data reading device 24.

Figure 4:
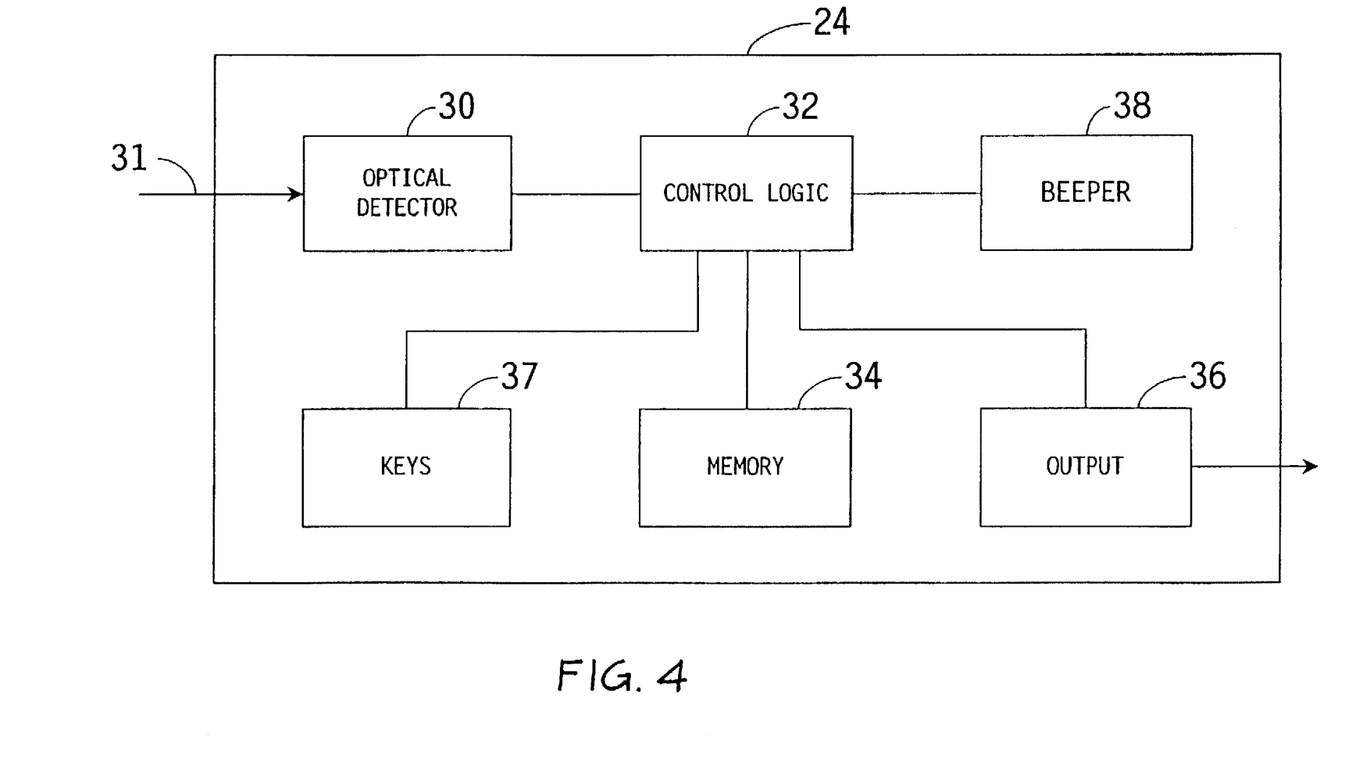
FIG. 4 is a block diagram of relevant electronic circuitry of the data reading device.

As shown in FIG. 4, the data reading device 24 further comprises control logic or a controller 32 comprising a microprocessor (not shown), a memory arrangement 34 associated with the microprocessor, output means 36 for outputting data received from controller 32 and a beeper 38 controlled by the controller. The output means 36 could for example comprise a printer, a numeric or alphanumeric display, an output port, or take on any other suitable form. It preferably comprises a display 36 (also shown in FIG. 2). Operator manipulatable keys 37 may be provided to select the data to be displayed.

Figure 5:
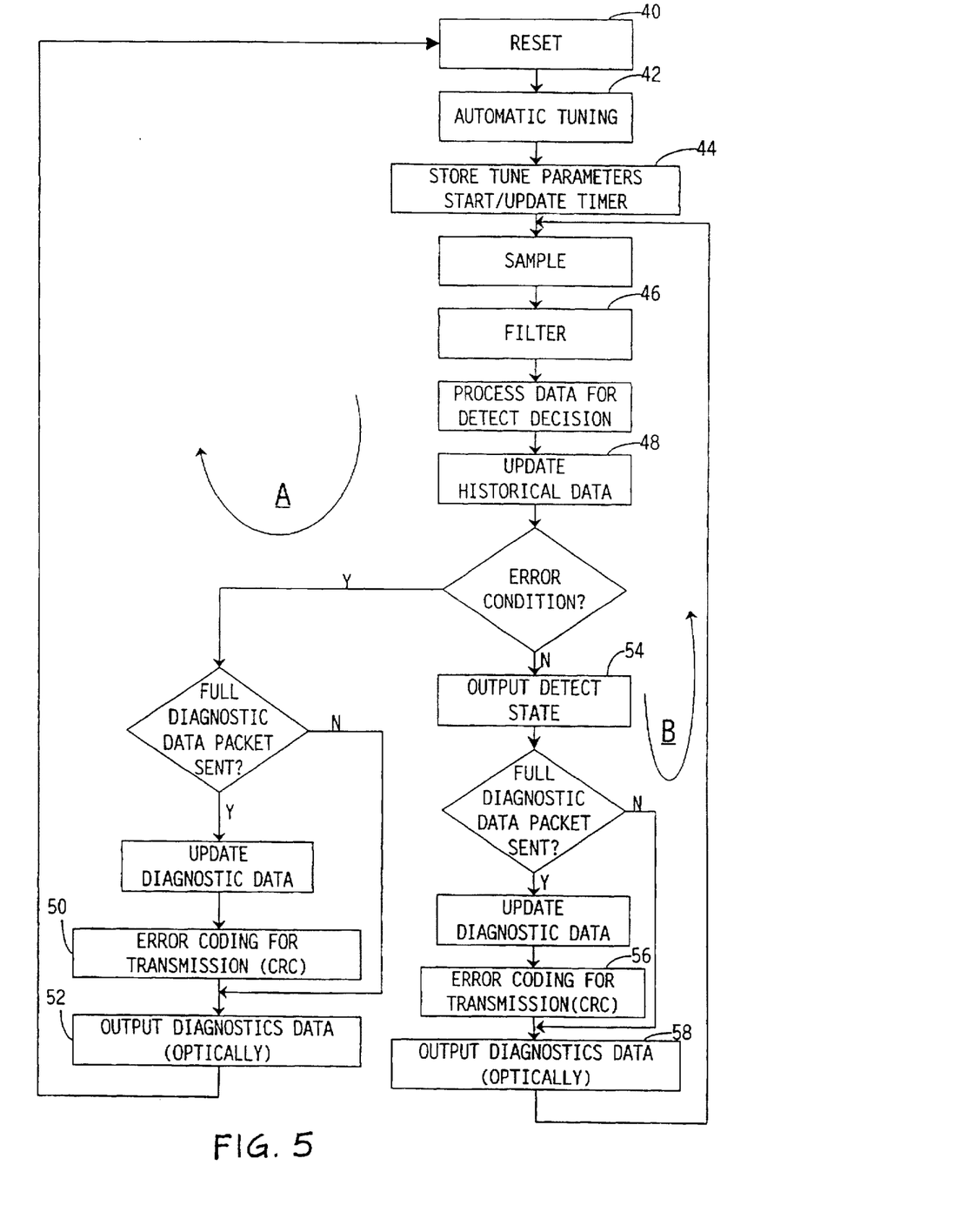
FIG. 5 is a basic flow diagram of an applications program running on a microprocessor forming part of the detector unit.

Reference is now made to FIG. 5 which is a flow diagram of an applications program running on the microprocessor of controller 18 of detector unit 14. After a reset 40 which is caused by any of the following: actuation of the manual reset button 40 (shown in FIG. 1) on the front face of unit 14, a power failure and subsequent restart, a short circuit error condition in loop 12 and an open circuit error condition in loop 12, the controller 18 at 42 tunes the loop 12 and drive circuit 16. Timer 19 is started at 44 after the reset and then updated until the next reset. The signal in the loop circuit 12 is sampled, filtered and processed at 46, to determine whether a vehicle has been detected, as hereinbefore described.

At 48, diagnostic data stored in the memory arrangement 20 is updated. This data includes historical data relating to maximum drift of the frequency of the drive signal for energizing the loop 12 and data relating to the minimum and maximum changes in inductance of the loop 12 during vehicle detection, both since the previous reset 40 of the unit, and real time data such as instantaneous frequency of the drive signal, cross-talk from adjacent loops and loop status such as open circuit, short circuit, vehicle detect and no vehicle detected.

In the event of an error condition, such as an open loop or short circuit condition on the loop 12, the next step is that at 50 the stored diagnostic data in the memory 20 is updated and arranged in a bit stream also comprising bits comprising synchronization data, the bit stream length and bits of a cyclic redundancy check (CRC). Thereafter at 52, the microprocessor causes the visible red light emitted by LED 22 to be modulated with the data stream. It is desirable to transfer the data at a high rate so that the time required for data transfer is limited to an acceptable period. A suitable data transfer rate is achieved when the emitted light is modulated at an average pulse frequency which may vary between 50 HZ to 3600 HZ. At this rate, it is not humanly possible to interpret the data. Once the bit stream has been emitted, the processor returns to the tuning step at 42 and proceeds again through loop A.

If there is no error, the next step is for the controller 18 at 54 to output to the aforementioned traffic or boom controller, the detect state of either VEHICLE DETECTED or NO VEHICLE DETECTED. Thereafter, the stored diagnostic data in the memory 20 is updated and arranged at 56 as hereinbefore described. At 58, the microprocessor causes the light emitted by LED 22 to be modulated as hereinbefore described, to transmit the data.

It will be appreciated that between reset conditions, the aforementioned diagnostic data is continuously updated and repeatedly transmitted, as clearly indicated by the loops designated A and B.

Figure 6:
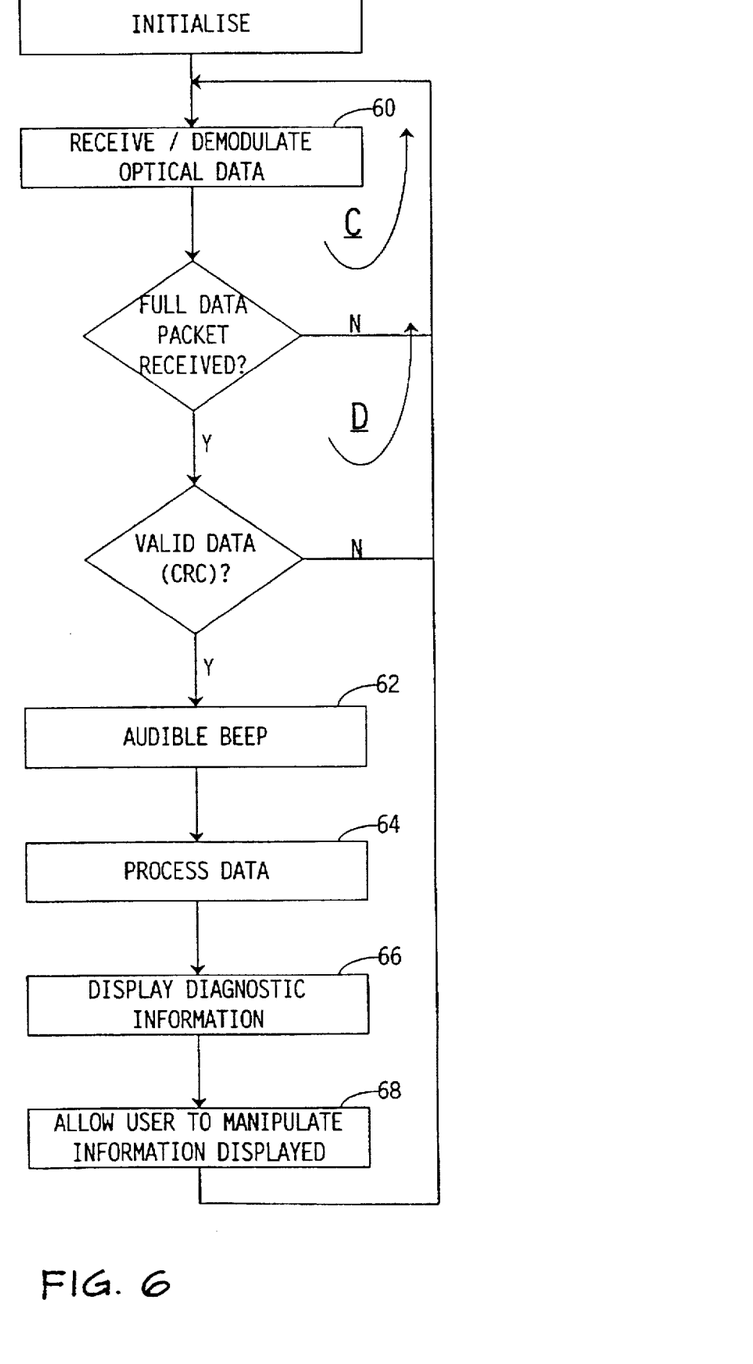
FIG. 6 is a basic flow diagram of an applications program running on a microprocessor forming part of the data reading device.

Reference is now made to FIG. 6. When the hand-held data reading device 24 is brought into optical data communication with detector unit 14, the transmitted data is received by detector 30 and demodulated as shown at 60. Based on the aforementioned bit stream length data forming part of the bit stream transmitted, the controller 32 determines whether the entire bit stream transmitted has been received. If not, the microprocessor remains in loop C. The microprocessor further remain in loop D until the CRC test indicates that valid and correct data has been received.

Thereafter and at 62, the data reading unit 24 provides an audible indication via beeper 38 that the transmitted data has been received.

In the data reading unit 24 the received data is processed and stored at 64. The data may be displayed on display 36 of the device 24 as shown at 66. As shown at 68, the program may also allow an operator to select the data to be displayed on display 36, by means of keys 37.

The system according to the invention thus continuously updates diagnostic data relating to the performance of the detector 10 in the memory of the detector unit 14 and repeatedly transmits that data at a sufficiently high rate, so as not to interfere with the other processing tasks of the controller 18 of the unit 14. The data reading unit 24 may conveniently be brought into data communication with the unit 14 and it provides an audible indication to the operator, once the transmitted data has been received fully and accurately.

An intermittent fault such as that described In the introduction of this specification will be located by the system according to the invention and an operator will be able to identify the cause of the fault. Should the loop become open circuit due to expansion, it will be treated as a reset condition caused by an open circuit. Timer 19 will be started When the loop becomes closed again, the diagnostic data will include data relating to the last reset which was caused by the open circuit and the time elapsed since that reset. From the diagnostic data transmitted to device 24, the operator will be able to determine that although the detector may be operating normally at the time when the diagnostic data is received, a fault condition occurred a known time ago and he will be able to confirm whether the open circuit occurred during a hot period of a day and that it accordingly probably was caused by expansion of the pavement structure.

It will be appreciated that there are many variations in detail on the system and method according to the invention without departing from the scope and spirit of the appended claims.

We claim:

1. A method of transferring diagnostic data from an inductive loop vehicle detector comprising an inductive loop and a detector unit connected to the loop, the method comprising the steps of:

continuously generating within the detector unit diagnostic test data relating to performance of the loop;

storing the generated data in a memory arrangement of the detector to produce stored date comprising at least historic diagnostic data generated over a period of time;

repetitively modulating at least one optical signal output means with the stored data at such a rate that the data is not discernible to a human;

detecting by means of a portable data reading device the signal emitted;

storing data extracted from the signal; and retrieving the extracted data.

2. A method as claimed in claim 1 wherein the stored data further comprises instantaneous diagnostic data.

3. A method as claimed in claim 1 wherein the historic data comprises at least one of: maximum frequency drift of a signal energizing the loop; minimum and maximum change in inductance of the loop during detection of a vehicle; and time elapsed, all since an immediately preceding reset of the detector.

4. A method as claimed in claim 2 wherein the instantaneous diagnostic data comprises at least one of: frequency of a signal energizing the loop; change in inductance of the loop; and loop status data.

5. A method as claimed in claim 3 wherein the historic diagnostic data is produced by, as from the immediately preceding reset of the detector, continually updating the maximum drift of the signal energizing the loop; the maximum and minimum change in inductance of the loop during detection of a vehicle and the time elapsed.

6. A method as claimed in claim 1 wherein a signal discernible by a human is provided once the stored data has been received at least once by the data reading device.

7. A system for transferring diagnostic data relating to performance of an inductive loop vehicle detector, the system comprising:

an inductive loop vehicle detector and a separate data receiving device;

the inductive loop vehicle detector comprising an inductive loop mountable in a pavement structure and a detector unit connected to the loop;

the detector unit comprising:

a signal source for energizing the loop;

control means for monitoring the loop and generating diagnostic data relating to operation of the loop and the signal source;

memory means for storing and compiling stored data comprising diagnostic data generated over a period of time; and optical output means, which under the control of the control means is repetitively modulated by a modulation signal which is dependent on the stored data at a rate such that the data would not be discernible by a human;

the separate data reading device comprising:

optical energy sensitive means;

means responsive to the optical energy sensitive means, to produce an output signal which is representative of the modulating signal;

data storage means for storing data extracted from the output signal; and means for retrieving data from the data storage means.

8. A system as claimed in claim 7 wherein the optical output means comprises a visible light emitting diode provided on a front face of the detector unit.

9. A system as claimed in claim 8 wherein the visible light emitting diode is a power-up indicator of the detector unit.

10. A system as claimed in claim 7 wherein the data reading device comprises an audible alarm which is activated once the stored data has been received by the data reading device, at least once.

11. An inductive loop vehicle detector comprising:

an inductive loop mountable in a pavement structure; and a detector unit connected to the loop, the detector unit comprising:

a signal source for energizing the loop;

control means for monitoring the loop and generating diagnostic data relating to operation of the loop and the signal source;

memory means for storing and compiling stored data comprising diagnostic data generated over a period of time; and optical output means, which under the control of the control means is repetitively modulated by a modulation signal which is dependent on the stored data at a rate such that the data would not be discernible by a human.

12. A data receiving device for use in receiving diagnostic data relating to performance of an inductive loop vehicle detector, the detector comprising an inductive loop and a detector unit connected to the loop, the data receiving device comprising:

optical energy sensitive means adapted to be brought into communication with an optical output means of the detector unit;

means responsive to the optical energy sensitive means, to produce an output signal which is representative of a modulating signal used to modulate the optical output means;

data storage means for storing data extracted from the output signal; and means for retrieving data from the data storage means.

* * * * *